P. SACHS.
SYSTEM OF TRANSPORTATION.
APPLICATION FILED SEPT. 15, 1919.

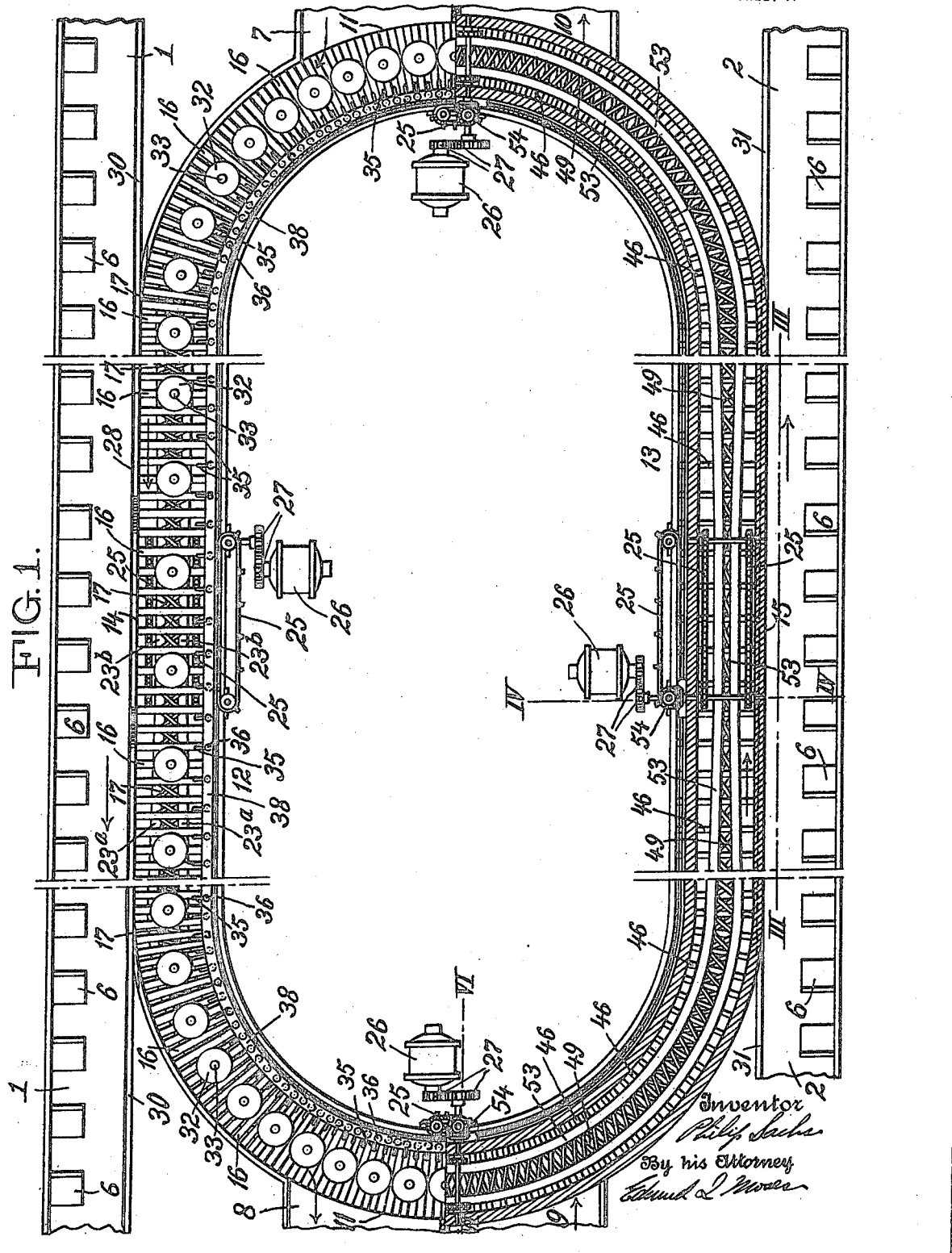

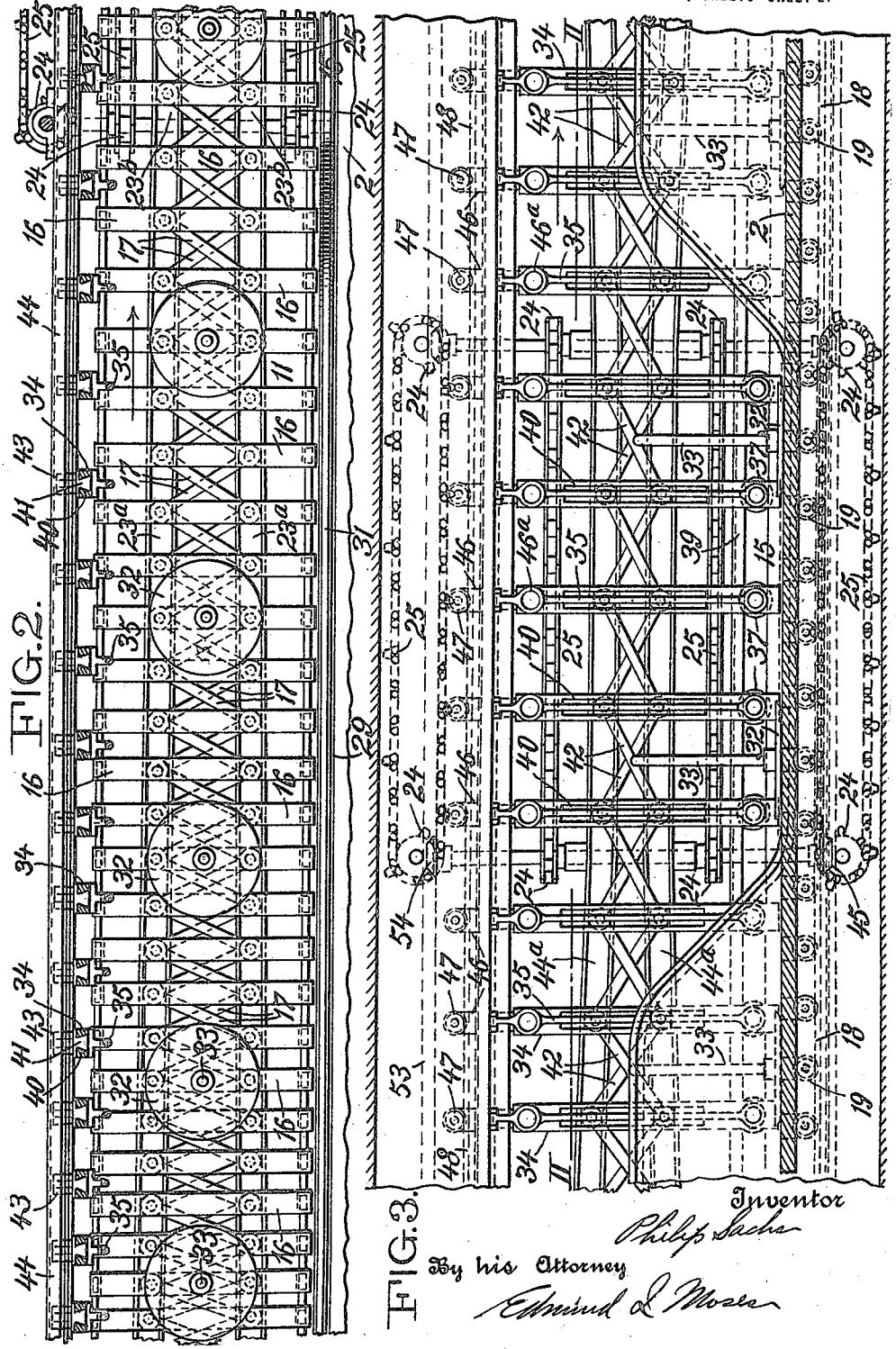

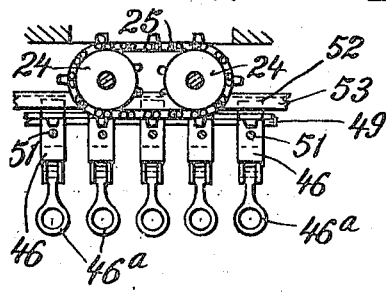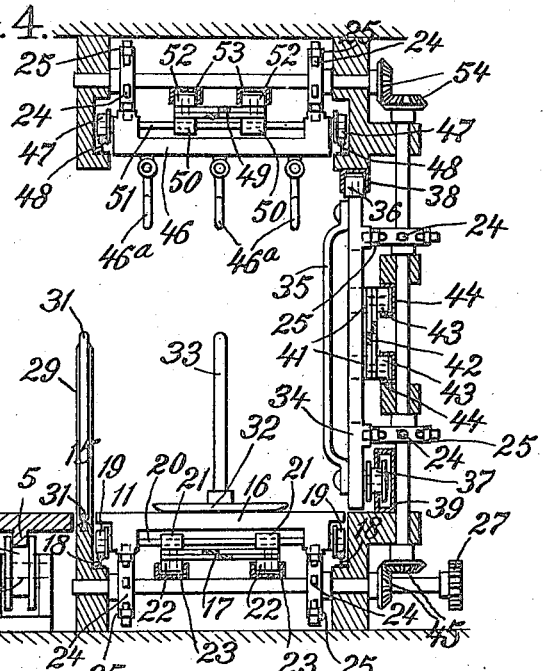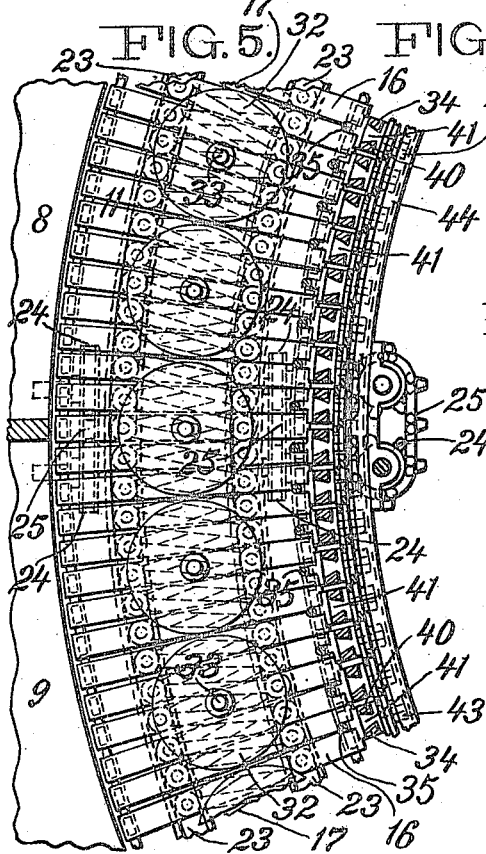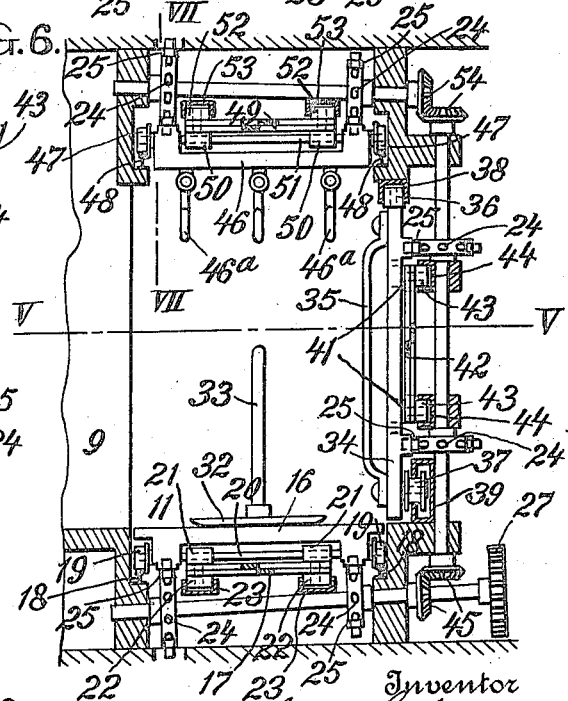

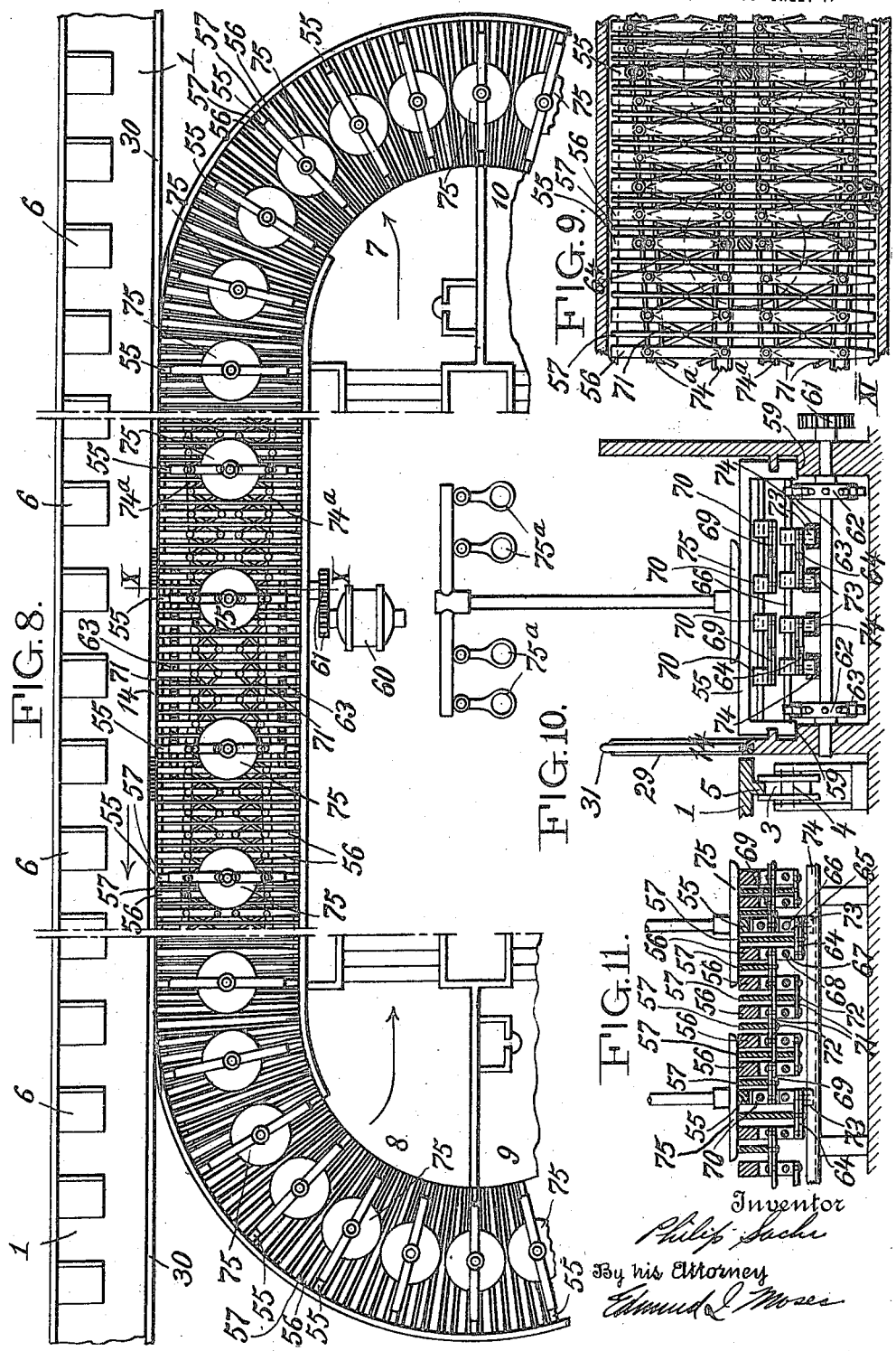

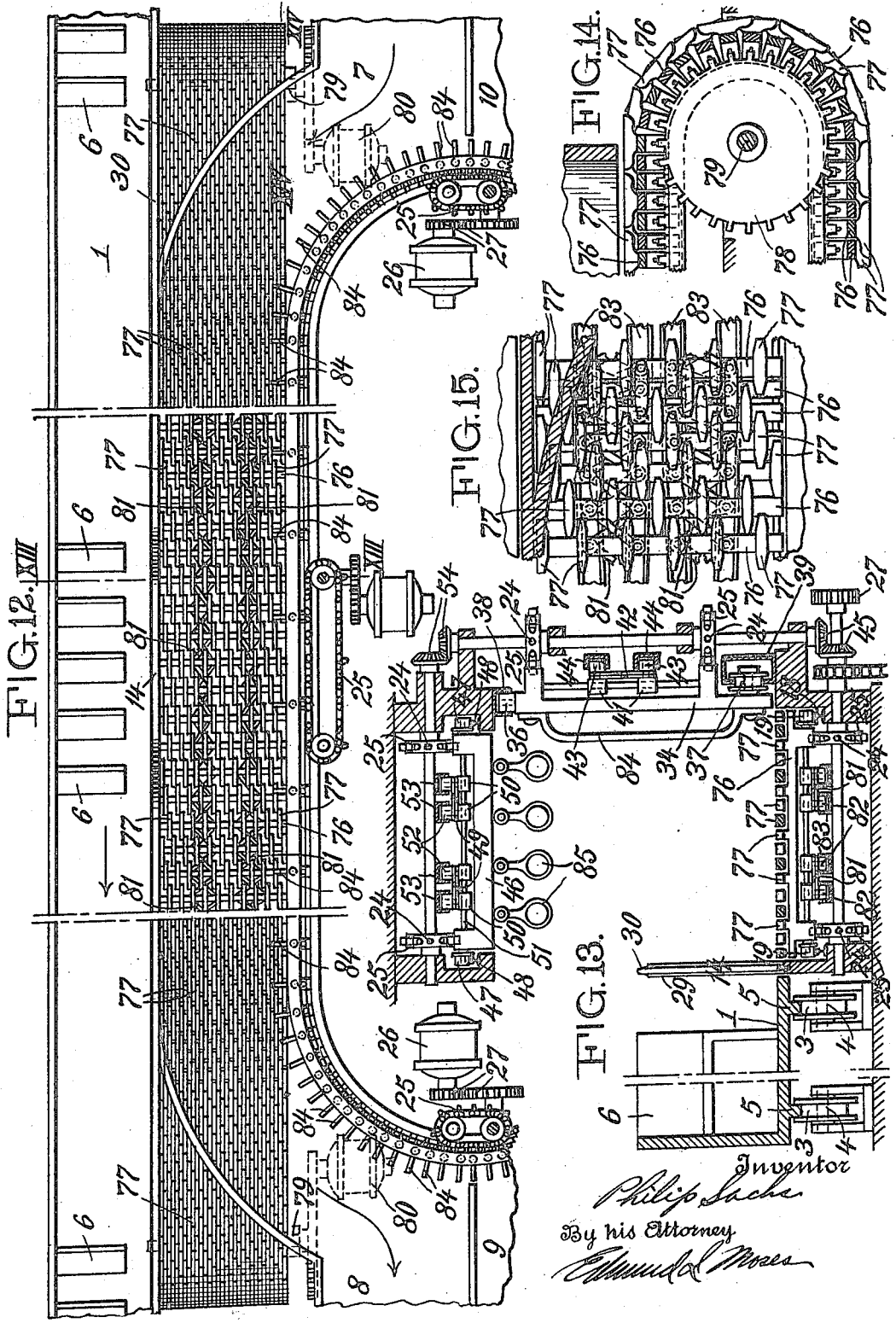

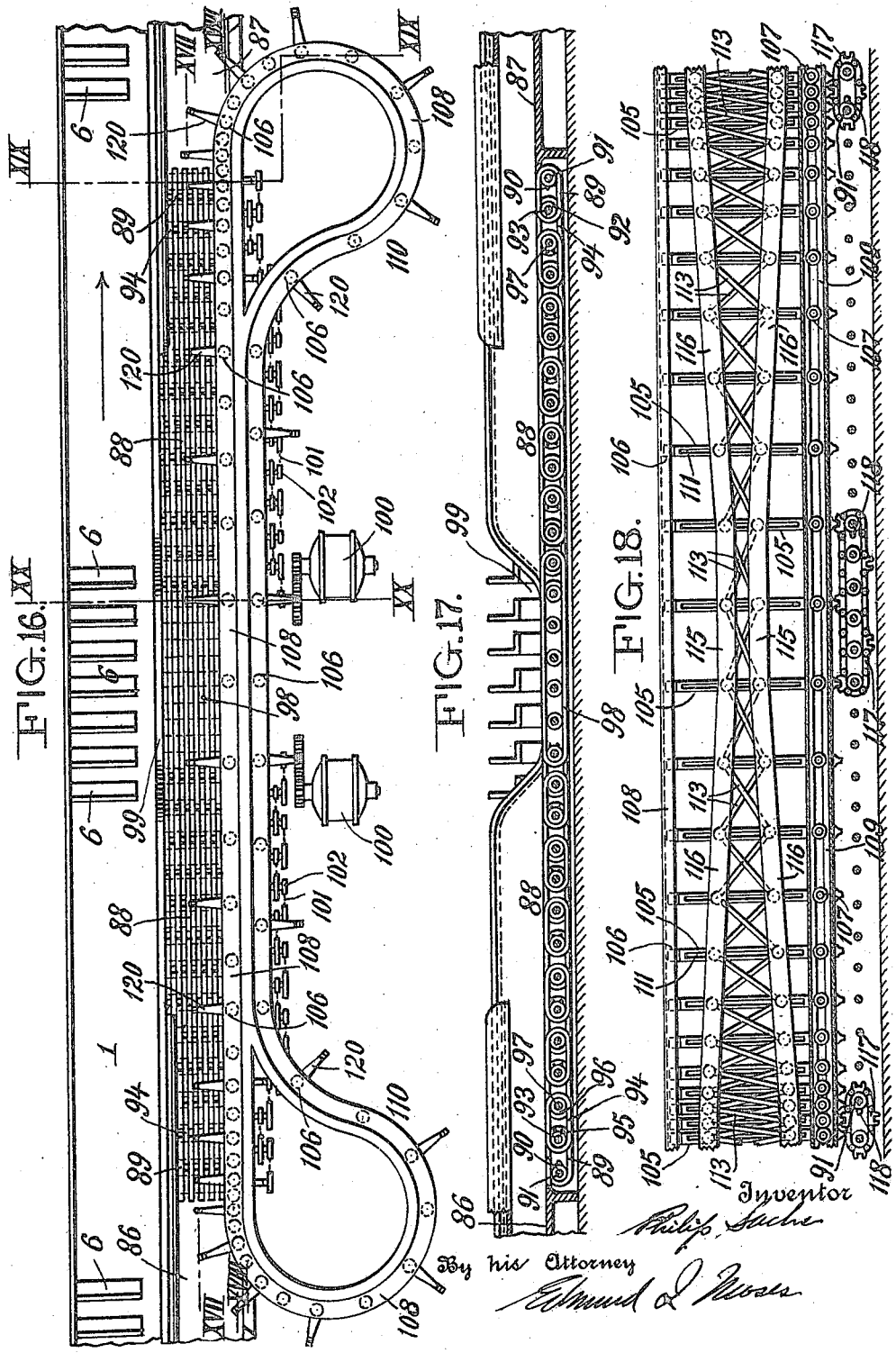

1,412,896.

Patented Apr. 18, 1922.

Inventor
Philip Sachs
By his Attorney
Edmund L. Moses

UNITED STATES PATENT OFFICE.

PHILIP SACHS, OF NEW YORK, N. Y.

SYSTEM OF TRANSPORTATION.

1,412,896.  Specification of Letters Patent.  Patented Apr. 18, 1922.

Application filed September 15, 1919. Serial No. 323,717.

*To all whom it may concern:*

Be it known that I, PHILIP SACHS, a citizen of the United States, residing at New York, in the county of New York and State of New York, have invented certain new and useful Improvements in Systems of Transportation, of which the following is a specification.

This invention relates to a system of transportation which is applicable to the transportation or conveyance of either passengers or freight.

The subject matter to which the invention relates in its broader aspects is described in my copending application, filed August 14, 1918, Serial No. 249,763, and provides loading and unloading stations for transportation systems of the moving platform type, whereby acceleration and retardation of the passengers or freight to conform to the speed of travel of the moving platform as the passenger boards or alights from the moving platform, after being once initiated, is accomplished automatically by a longitudinal movement in the direction of travel of the moving platform, rather than by a lateral movement from one surface to another surface traveling at different speeds, as is common in the moving platform types of transportation systems now known. The acceleration or retardation may be accomplished either by a steady or uniform movement involving no abrupt changes in speed, or the successive steps in the acceleration or retardation may be so gradual as to substantially accomplish this result. The acceleration or retardation thus takes place without requiring any special effort or attention on the part of the passenger, and the inconvenience and danger incident to sudden changes in speed are eliminated.

The objects of the present invention are to provide a system of transportation of the character described, which embodies improved means for producing the acceleration and retardation of the loading and unloading platform in the direction of travel of the conveyor platform; to simplify the construction whereby the boarding of and alighting from the moving platform conveyor may take place at one and the same place intermediate the length of the loading and unloading platform, for these purposes to utilize a continuous and endless loading and unloading platform instead of two independent platforms; to provide hand-holds for the passengers whereby the passengers may steady themselves as the loading and unloading platform increases or decreases in speed; to provide means whereby the handholds are accelerated and retarded simultaneously with and at the same speed as the corresponding portion of the loading and unloading platform; and to accomplish other objects and results as may be brought out in the following description.

Various instrumentalities may be employed for carrying out my invention, some of which I have shown, for the purpose of illustrating the principle of the invention, in the accompanying drawings, in which:—

Figure 1 is a plan view of one embodiment of the invention adapted for use with two moving platform conveyors traveling in opposite directions, a portion thereof being a top plan view of the loading and unloading platform, and another portion a top plan view of the hand-hold mechanism therefor.

Figure 2 is an enlarged fragmentary top plan view of the loading and unloading platform, portions being shown in section, on the line II—II of Figure 3.

Figure 3 is a vertical longitudinal section on line III—III of Figure 1.

Figure 4 is a transverse vertical sectional view on the line IV—IV of Figure 1.

Figure 5 is a horizontal section on the line V—V of Figure 6.

Figure 6 is a transverse vertical sectional view on the line VI—VI of Figure 1.

Figure 7 is a vertical sectional view on the line VII—VII of Figure 6.

Figure 8 is a view similar to Figure 1, showing a modified construction, portions being broken away.

Figure 9 is an enlarged fragmentary plan view of one side of the device as illustrated in Figure 8.

Figure 10 is a transverse vertical sectional view on the line X—X of Figure 8.

Figure 11 is a vertical longitudinal sectional view on the line XI—XI of Figure 9.

Figure 12 is a top plan view of a further modified construction, portions being broken away;

Figure 13 is a transverse vertical sectional view on the line XIII—XIII of Figure 12.

Figure 14 is a longitudinal sectional view on the line XIV—XIV of Figure 12.

Figure 15 is a fragmentary detail top plan view of the belt of the loading and unloading platform shown in Figure 12.

Figure 16 is a top plan view of another modified construction utilized in connection with a single moving platform conveyor.

Figure 17 is a longitudinal sectional view through the same on the line XVII—XVII of Figure 16.

Figure 18 is a longitudinal section on line XVIII—XVIII of Figure 16.

Corresponding and like parts are referred to in the following description and indicated in all the views of the drawings by the same reference characters.

Figure 19:
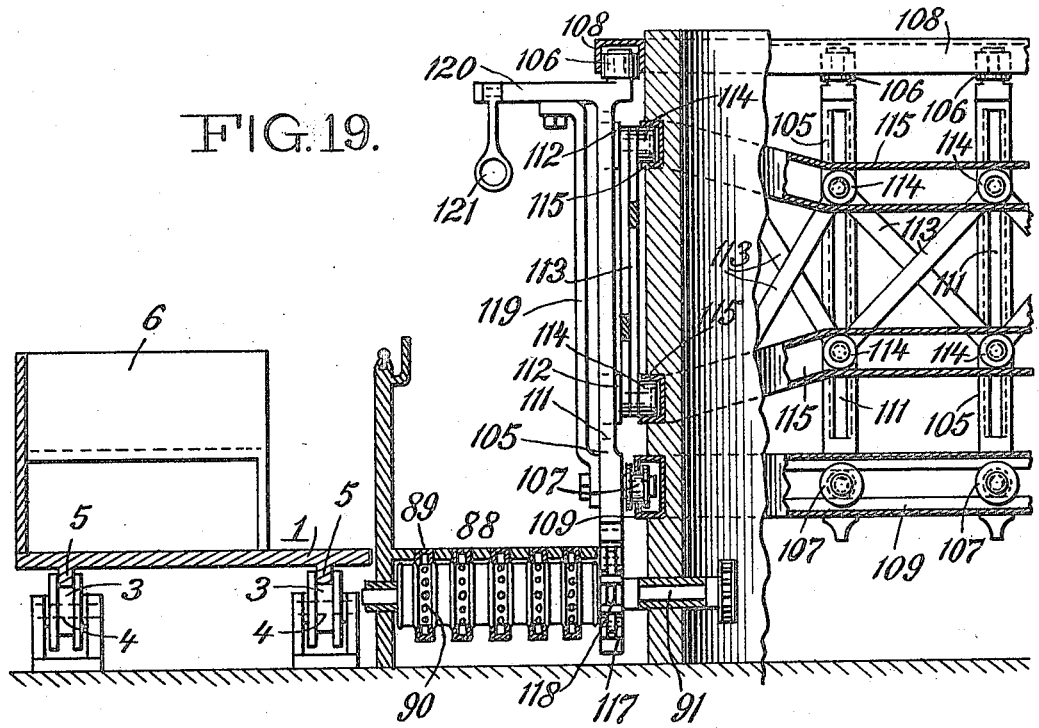
Figure 19 is a transverse vertical sectional view on the line XIX—XIX of Figure 16.
Figure 20:
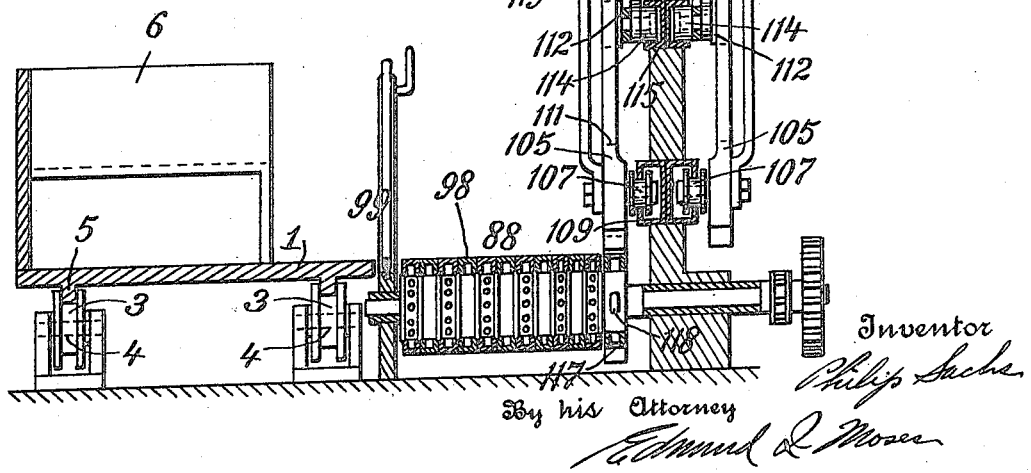
Figure 20 is a similar view on the line XX—XX of Figure 16.

Referring to the embodiment of the invention illustrated in Figures 1 to 7, inclusive, the numerals 1 and 2 designate the main transporting elements of the system which comprise two moving platforms which in this instance are designed to travel in opposite directions. For convenience, the platform 1 can be designated the up-town platform and the platform 2 the down-town platform. These platforms may be of any suitable construction, and are arranged to be driven in any suitable manner, at as high a speed as is desirable and practicable, upon a series of rollers 3 mounted on shafts 4, rails 5 being provided on the under sides of the platforms for engagement with the rollers. If desired, the platforms 1 and 2 may be provided with seats 6.

At suitable intervals along the line of the main platforms 1 and 2, stations are provided for loading and discharging passengers. Each station may be provided with an entrance 7 and an exit 8 for the uptown platform, and an entrance 9 and exit 10 for the downtown platform 2. These entrances and exits communicate with a loading and unloading platform 11 which comprises a continuously moving endless belt or chain, arranged between the platforms 1 and 2 which runs for portions of its length, as at 12 and 13, parallel to and in the same directions as the platforms 1 and 2, the various elements of the belt gradually increasing in speed from the station entrances 7 and 9 to the entrance and exits or transfer points 14 and 15 to the conveyor platforms 1 and 2, and gradually decreasing in speed from the entrance and exits 14 and 15 to the platforms 1 and 2, to the station exits 8 and 10.

In the construction illustrated, this loading and unloading platform 11 comprises a series of horizontally disposed slats or bars 16 which are interconnected by means of the lazy-tong links 17 arranged beneath the bars. The bars 16 are arranged substantially flush with the conveyor platforms 1 and 2 and the station entrances and exits, and run on rails 18 by means of rollers 19 arranged at the ends of an axle or rod 20 which is arranged longitudinally of each bar 16. The ends of the lazy-tong links 17 are pivoted to blocks 21 which slide on the rods 20, and the ends of the links 17 also carry on their undersides rollers 22 which engage channel tracks or guideways 23. The platform 11 is in the form of a loop, the curved ends being arranged adjacent the station entrances and exits, while the straight portions 12 and 13 are arranged parallel to and adjacent the conveyor platforms 1 and 2. The channel tracks 23 are arranged parallel to each other on the ends of the loop, but gradually converge inwardly toward each other from both ends of the loop along the straight portions 12 and 13, as shown at 23$^a$ in Figures 1 and 2. Opposite the entrance and exit openings 14 and 15 the converging portions 23$^a$ of the guideways merge into parallel portions 23$^b$ of a length substantially equal to the width of the openings 14 and 15. The platform 11 is actuated by any suitable means such as the sprockets 24 and chains 25 which engage the undersides of the bars 16, and are driven by any suitable means, such as the motors 26 and gearing 27. It will thus be obvious that the bars 16 and lazy-tong links 17 form substantially an endless belt which moves on the rollers 19 along the rails 18. The lazy-tongs hold the bars 16 close together at the ends of the loop by means of the rollers 22 engaging the channel guide-ways 23 which are parallel at the ends of the loop, and the belt or platform 11 is driven at such a speed that a passenger can easily and without danger step from the entrances 7 or 9 to the platform 11, or from the platform 11 to the exits 8 or 10. It will be noted that the inside sprockets 24 on the curves at the end of the platform 11 are smaller in diameter than the other sprockets so as to compensate for the difference in distance travelled by the outer and inner ends of the bars 16 on the curves. As the rollers 22 reach the converging portions 23$^a$ of the guideways 23 they are drawn together by the converging guideways so as to extend the lazy-tongs. This causes an increased speed of the bars 16 relatively to the slowly moving ends of the platform so that the bars 16 over the converging portions 23$^a$ of the guideways move at a speed which is the resultant of the driven speed of the platform and the speed of extension of the lazy-tongs. The converging of the guideways 23 is preferably such that, as the bars 16 reach the entrances and exits 14 and 15 to the conveyor platforms 1 and 2, their speed is substantially the same as that of the conveyor platforms so that a passenger can step easily and without danger or special effort by the passenger from the platform 11 to the conveyor platforms 1 or 2, or vice versa. The parallel portions 23ᵇ of the guideways 23 cause the bars to move at substantially the speed of the conveyor platform 1 for a short time to allow the passenger to step off or on to the platform 11 before the speed thereof again changes. As the bars 16 and rollers 22 leave the converging portions of the guideways 23 a reverse action takes place, the lazy-tongs being contracted and the bars gradually decreasing in speed until they reach the station exits 8 or 10. Sufficient space is provided in the platform 11 to allow the extension of the lazy-tongs and movement of the bars 16, and it will be obvious that extension of the lazy-tongs at one end of the converging portions 23ᵃ of the guideways is allowed by the simultaneous contraction of the lazy-tongs at the other end, which action is continuous. Thus a passenger can step upon the loading platform 11 at either of the station entrances 7 or 9 and be carried to the conveyor platform entrances 14 or 15 at a gradually increasing speed and in the same direction as the travel of the conveyor platform, and step upon the conveyor platform with ease, or the passenger can alight from either conveyor platform 1 or 2 through the exits 14 or 15 to the unloading platform 11 and be carried to the corresponding exit 8 or 10 at a gradually decreasing speed, without danger, discomfort, or special effort or attention. Guard rails or partitions 28 and 29 are arranged between the loading platform and the conveyor platforms 1 and 2 to prevent a passenger from stepping to or from the conveyor platforms except at the entrances and exits 14 or 15, said guard rails being provided at the top thereof with handrails 30, 31 which travel at the same speed as the conveyor platforms 1 and 2. These hand rails serve as a warning to the passenger desiring to leave the conveyor platform, as, if he is holding on to the hand rail, he will feel it going down from under his hand and know that an exit opening 14 or 15 has been reached. It will be noted that as the bars 16 reach the converging portions of the guideways 23, they are slightly separated by the extension of the lazy-tongs but not sufficiently to allow a passenger's foot to fall between them. However, if desired a series of platforms 32 may be mounted on some of the bars 16 on which passengers may stand. The platforms 32 are provided with upwardly extending posts 33 which may serve as hand-holds.

It is desirable to provide hand-hold means on the loading and unloading platform 11 for passengers to grasp to steady themselves as the platfrom 11 moves. For this purpose a plurality of vertical standards 34 are arranged along the inside of the platform 11. each bar having a handle rod 35 thereon, and each bar being provided at its upper and lower ends with rollers 36 and 37, respectively, which engage guideways 38 and 39, extending the whole distance around the platform 11. It is obvious that these hand-holds must travel at the same rate of speed as the platform 11, and for accomplishing this purpose each standard 34 is provided with a longitudinal slot 40 in which run blocks 41 carried at the ends of lazy-tong links 42 which connect the various standards. The ends of the lazy-tong links 42 are also provided on the sides opposite the blocks 41 with rollers 43 which engage channel guideways 44 similar to the guideways 23, the said guideways 44 being substantially parallel at the ends of the platform 11 but converging toward each other along the straight portions of the platform 11, as at 44ᵃ, exactly as do the guideways 23. The standards 34 are driven from the same motors 26, through gearing 45 and sprockets and chains 24 and 25 exactly as is the platform 11, as above described. The rollers 43 engaging the guideways 44 extend and contract the lazy-tongs 42 simultaneously with, in exactly the same manner, and at the same speed as the rollers 22 and guideways 23 move the platform 11.

Another hand-hold mechanism is arranged over the top of the platform 11 at a height sufficient to allow the tallest person to stand under it. This mechanism is substantially identical in construction and arrangement as the platform 11 except that it is inverted. This hand-hold mechanism comprises the bars 46 identical with the bars 16 which have suspended therefrom looped hand-holds or straps 46ᵃ of conventional construction. The bars 46 are mounted on rollers 47 engaging elevated rails 48, and are interconnected by lazy-tong links 49 which are connected to blocks 50 slidable on the rods 51 on the bars 46. The links 49 also carry rollers 52 which engage channel guideways 53 constructed and arranged identically with the guideways 23 of the platform 11, and this whole hand-hold mechanism is also driven from the motors 26 through gearing 54 and sprockets and chains 24 and 25.

Figures 8 to 11 inclusive illustrate a modification of the invention in which the loading and unloading platform is provided with a plurality of master bars 55 corresponding to the bars 16 above described, between which are arranged a series of intermediate and supplemental bars 56 and 57, respectively. The master bars 55 and intermediate bars 56 engage tracks 59 and are actuated by means of the motors 60 through suitable gearing 61 and sprockets 62 and chains 63, substantially as in the construction shown by Figures 1 to 7, inclusive. Each master bar 55 is connected to one intermediate bar 56 by means of two series of lazy-tong links 64 which links are connected to blocks 65 slidable on rods 66 on the master bar, and to similar blocks 67 slidable on rods 68 on the intermediate bar 56, while the last of the series of intermediate bars is connected to its adjacent master bar by the links 69 and blocks 70. The intermediate bars 56 are connected in a similar manner by pairs of lazy-tong links 71, while the supplemental bars 57 are arranged between the master bars and intermediate bars and between the several intermediate bars, and are connected at 72 to the various lazy-tongs at the intersections of the links thereof, as shown in Figure 11. The ends of each series of lazy-tong links 64 connected to the master bars 55 carry rollers 73 which engage channel guideways 74 one pair of which is provided for each series of lazy-tong links, as shown in Figure 9. These guideways are constructed and arranged exactly as are the guideways 23 illustrated in Figures 1 to 7, inclusive, and the converging portions 74$^a$ of each pair of guideways operate to extend and contract the two series of lazy-tongs just as previously described. It will be noted that the links 71 connecting the intermediate bars 56, and the links 69 have no rollers and thus the extension of the links 64 cause and control the extension of the other links 69 and 71. The bars 55, 56 and 57 may be constructed of thin material so that when the lazy-tong links are extended the spaces between them are small, the sizes of the bars and spaces being necessarily exaggerated on the drawings. If desired, platforms or stands 75 may be provided on the master bars on which passengers may stand, and hand-holds 75$^a$ may also be provided. It will be obvious that the same hand-hold system shown by Figures 1 to 7 can also be used in connection with this form of the invention.

A further modification of the invention is illustrated by Figures 12 to 15, inclusive, of the drawings, in which a separate loading and unloading platform is provided for each conveyor platform. In this construction the loading and unloading platform or belt comprises a plurality of transverse bars 76 substantially identical with the bars 16 above described, with the exception that each bar 76 is provided on the top side thereof with a series of narrow longitudinally extending treads 77, arranged at right angles to the bars, the treads of the various bars 76 being arranged in a staggered relation so as to overlap or mesh together to form a closely constructed tread surface, as shown in Figure 12, so as to prevent all possibility of a passenger's foot being caught in the platform as it extends and contracts. In this instance the platform is driven by and passed over comparatively large sprockets 78 mounted on horizontal shafts 79 geared to motors 80, the reaches of the belt being superposed and passing one over the other instead of side by side as shown in the constructions illustrated in Figures 1 to 11. The constructions and operation of this platform are otherwise identical with that described in connection with Figure 1 to 7, including the lazy-tong links 81, rollers 82, and channel guideways 83. Side hand-holds 84 and over-head hand-holds 85 may also be provided, said hand-holds being identical in construction and operation with the corresponding hand-holds shown in Figures 1 to 6.

Figures 16 to 20, inclusive, of the drawings illustrate another modification of the invention which embodies a construction similar to that illustrated and described in my copending application filed August 14, 1918, Serial No. 249763. An entrance passage 86 and an exit passage 87 are arranged at opposite ends of the loading and unloading platform 88. The platform 88 comprises a series of overlapping or interlocking endless belts driven at progressively varying speeds, the said belts gradually increasing in speed from both ends thereof toward the center. Thus, the platform 88 is provided at its ends adjacent the entrance 86 and exits 87 with a series of short belts 89 traveling at a low rate of speed and driven at one end by sprockets 90 mounted on shafts 91, the other ends of the belts passing over idler pulleys 92 on shafts 93. These belts 89 are narrow and spaced apart sufficiently to receive between them a second series of belts 94 driven at one end by sprockets 95 on the shafts 93, the other ends thereof passing over idler pulleys 96 on shafts 97. These belts 94 are driven at a slightly higher speed than the belts 89, and successive series of belts interlock with each other in a similar manner, each being driven at a somewhat higher rate of speed until the center series of belts 98 is reached, which belts travel at substantially the same speed as the conveyor platform 1, and constitute the loading and unloading zone for the conveyor platform 1. These belts 98 are arranged adjacent the entrance and exit opening 99 for the platform 1, and a passenger entering at 86 is conveyed at a gradually increasing speed to these belts 98 from which he can easily step to the conveyor platform 1. Similarly a passenger may alight from the conveyor platform 1 to the belts 98 and be conveyed at a gradually decreasing speed to the exit 87. The various shafts for driving the belts are driven by suitable motors 100 through chains and sprockets 101 and 102, the sprockets being properly proportioned to produce the desired speed ratios. The construction of this modification so far described is substantially identical with that of my before mentioned copending application, except that only one loading and unloading zone is provided between the ends of the platform 88 instead of two zones, one at each end of the platform, as in the said application.

A hand-hold mechanism is also provided, as in the previously described embodiments of the invention, to steady the passenger on the loading and unloading platform. The hand-hold mechanism in this instance comprises a plurality of vertically disposed standards 105 arranged along the inside of the platform 88 similarly to the side hand-holds already described, said standards being provided at their upper and lower ends with rollers 106 and 107, respectively, engaging endless tracks 108 and 109 which extend parallel to the platform 88 and are looped, as at 110, at their ends. These standards 105 are provided with slots 111 to receive blocks 112 connected to the ends of lazy-tong links 113, the ends of said links being also provided with rollers 114 which engage endless channel guideways 115. These guideways 115 are similar in construction to the guideways 44 shown in Figures 1 to 6 and have converging portions 116 which extend the lazy-tongs at a gradually increasing speed, as previously described. This hand-hold mechanism is driven by means of the motors 100 through the chains and sprockets 117 and 118 which engage the lower ends of the standards 105, as shown in Figures 18 and 19. The standards 105 are provided with hand-hold rods 119, and if desirable, the upper ends of the standards may be formed with extensions 120 overhanging the platform 88, to which are connected hand-hold loops or straps 121. The speed of travel of this hand-hold mechanism is substantially the same as that of the passenger on the platform 88, as previously described.

While I regard the localization of the loading and unloading means at stations spaced at desired points along the line as an important and valuable capability of my invention I do not wish to be limited only to this arrangement as in some instances, such as on short congested lines, the loading and unloading platforms may be made continuous. For instance, the zones 12 and 13 of the accelerating platform may be extended along the whole length of the main moving platform between stations, the accelerating end of the loading and unloading platform being located at one station and the retarding end thereof being located in another station. In such a construction, a passenger may remain on the auxiliary platform 11 or pass over to the main platform or back again at any point between stations. In some cases also, it might even be desirable to do away entirely with the main platforms 1 or its equivalent and to use the zones 12 and 13 as the main conveying means traveling at a high speed, and having at one end an accelerating zone and at the other end a retarding zone, as shown in the drawings. Such an arrangement might be suitable especially for very short carries. This idea and construction was disclosed in my copending application filed August 14, 1918, Serial No. 249,763, and the present application is a continuation in part of said copending application.

With all of the constructions described it will be seen that the loading and unloading platform for each conveyor platform travels in the same direction as the conveyor platform and that the acceleration and retardation takes place longitudinally of the loading and unloading platform. Also it will be observed that one and the same zone of the accelerating and retarding platform serves as both a loading and unloading zone, so that passengers may board and alight from the conveyor platform at the same point. The speed of travel of various elements of the loading and unloading platform gradually increases from the station entrance to the loading zone where the speed is substantially the same as that of the conveyor platform, and the speed of the elements of the loading and unloading platform gradually decreases from the loading and unloading zone to the station exit, so that a passenger may board or alight from the conveyor platform without the danger, inconvenience, or special attention usually incident to stepping to and from surfaces traveling at different speeds.

While I have shown and described in detail certain possible embodiments of my invention as illustrative of the principle thereof, I realize that my invention may be embodied in many other ways and I do not desire to be limited to the particular construction and mode of operation set forth but intend to cover my invention broadly in whatever form its principle may be embodied.

Having thus described the invention, I claim:

1. In a system of transportation, a bodily movable horizontal platform various portions of which move at relatively varying speeds.

2. In a system of transportation, a bodily movable horizontal platform, means for moving said platform, and means for moving various portions of said platform at speeds varying relatively to each other and to the platform.

3. In a system of transportation, the combination with two spaced and oppositely moving main conveying platforms, of a single loading and unloading means common to both main platforms, and means for moving various portions of the loading and unloading means at relatively varying speeds and in the directions of travel of both platforms.

4. In a system of transportation, the combination with a main conveying platform, of loading and unloading means therefor moving at varying speeds throughout the length of its travel, said loading and unloading means having a common zone for both loading objects upon said main platform and receiving objects from said main platform.

5. In a system of transportation, the combination with a main conveying platform, of movable loading and unloading means therefor moving at varying speeds throughout the length of its travel said loading and unloading means having a common zone intermediate its length for both loading objects upon said main platform and receiving objects from said main platform.

6. In a system of transportation the combination with a main conveying platform, of a plurality of elements arranged in an endless series adjacent said main platform, and means for driving said elements at varying speeds along their length of travel in the direction of travel of the main platform.

7. In a system of transportation the combination with a main conveying platform, of a plurality of elements arranged one after another in an endless series, and means for driving said series of elements in the direction of travel of said main platform.

8. In a system of transportation, the combination of a plurality of elements arranged one after another in an endless series which is disposed in a substantially horizontal plane, and means for moving said series of elements.

9. In a system of transportation, the combination of a plurality of elements arranged one after another in an endless series which is disposed in a substantially horizontal plane, and means for driving said elements at relatively varying speeds along the length of travel.

10. In a system of transportation, the combination of a plurality of elements arranged one after another in an endless series, and means for driving said elements at relatively varying speeds along the length of their travel.

11. In a system of transportation, the combination of a plurality of elements arranged in an endless series, means for moving said series of elements at a predetermined speed, and means for moving the various elements of the series at relatively varying speeds simultaneously with the movement of the said series.

12. In a system of transportation, the combination with a main conveying platform, of loading and unloading means therefor comprising a plurality of platform elements, lazy-tong links connecting said elements into an endless series, means for driving said endless series, and means for extending and contracting said lazy-tong links at various portions in their travel to cause the platform elements to move at speeds varying relatively to each other and to the endless series.

13. In a system of transportation, the combination with a platform various portions of which move at relatively varying speeds, of hand-hold means arranged to travel at speeds corresponding to the varying speeds of the platform.

14. In a system of transportation, the combination with a platform various portions of which move at relatively varying speeds, of a hand-hold mechanism comprising a plurality of elements arranged in an endless series and moving at relatively varying speeds corresponding to the speeds of the platform.

15. In a system of transportation, the combination with a platform various portions of which move at relatively varying speeds, of a hand-hold mechanism comprising a plurality of elements having hand-holds thereon, means for interconnecting said elements in an endless series, means for moving said endless series of elements, and means for moving the various elements at various speeds relative to each other and to the endless series.

16. In a system of transportation, the combination with a platform various portions of which move at relatively varying speeds, of a hand-hold mechanism arranged adjacent said platform and comprising a plurality of elements arranged in an endless series, means for moving said endless series, and means for separating and drawing together certain of said elements at various positions in their travel to cause them to travel at relatively varying speeds corresponding to the speeds of the various portions of the platform.

17. In a system of transportation, the combination with a platform various portions of which move at relatively varying speeds, of a hand-hold mechanism comprising a plurality of hand-hold elements, lazy-tong links connecting said elements into an endless series, means for driving said endless series, and means for extending and contracting said lazy-tong links at various positions in the travel of said elements to cause the elements to move at speeds varying relatively to each other and to the series, and corresponding to the speeds of the various portions of the platform.

PHILIP SACHS.